Dec. 22, 1931.　　　J. C. McCUNE　　　1,837,466
SAFETY CAR CONTROL EQUIPMENT
Filed Sept. 28, 1929
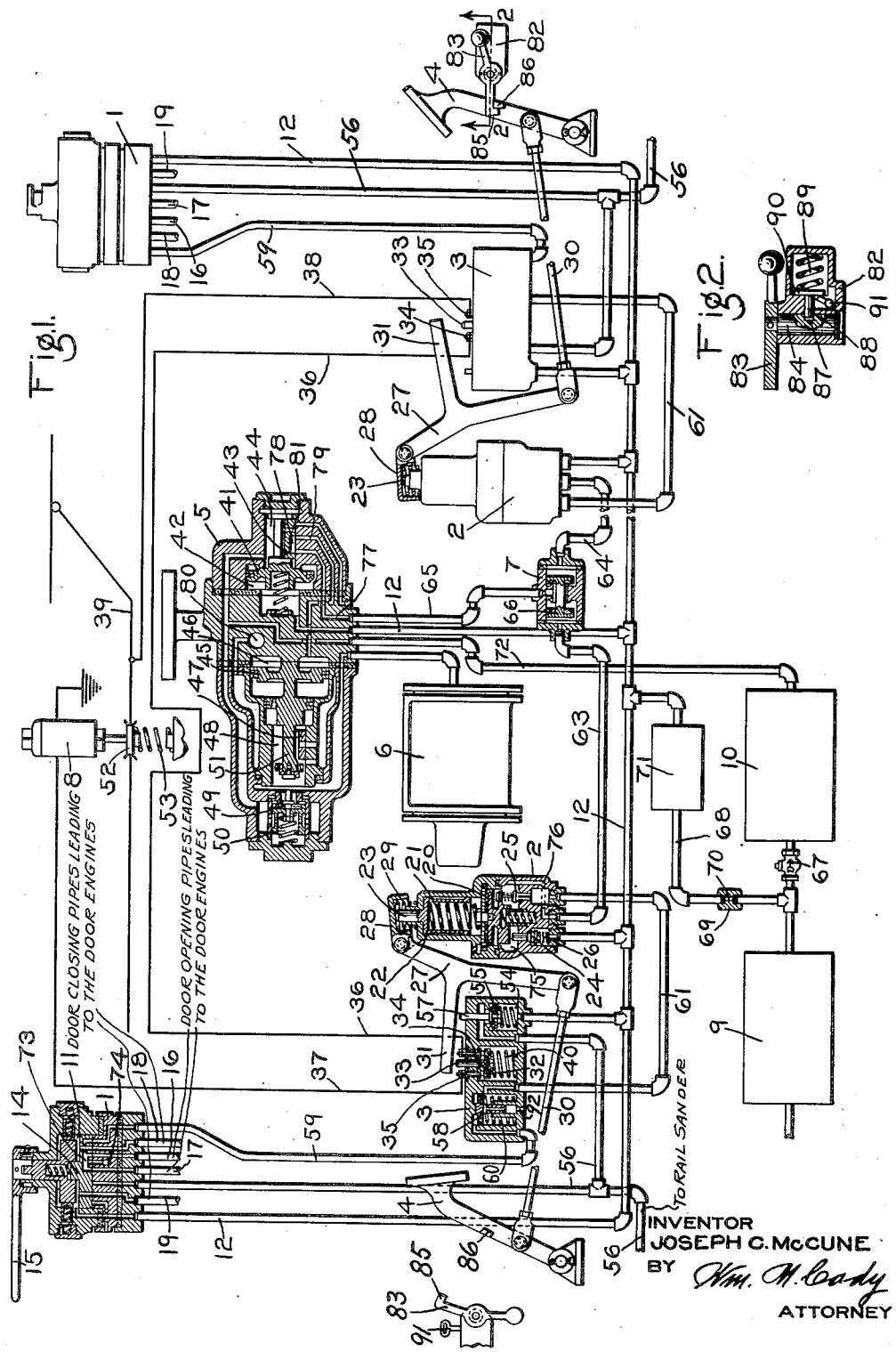
INVENTOR
JOSEPH C. McCUNE
BY
Wm. W. Cody
ATTORNEY Patented Dec. 22, 1931

1,837,466

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

SAFETY CAR CONTROL EQUIPMENT

Application filed September 28, 1929. Serial No. 395,775.

This invention relates to a safety car control equipment for controlling the brakes and the car doors on a car and in which the brakes are applied and the power circuit is opened when the operator becomes incapacitated.

One object of my invention is to provide a safety car equipment in which the control is effected through the operation of a pedal lever and in which the release of the pedal lever causes the brakes to be applied, the power circuit to be opened, and the rails to be sanded.

Another object of the invention is to provide means whereby the pedal lever may be locked to prevent its movement to effect an application of the brakes, provided a service application of the brakes has been made.

Another object of the invention is to provide improved means for effecting an application of the brakes whenever a car door is opened, provided a brake application has not already been made.

Other objects and advantages will appear in the following more detailed description of the invention.

In the accompanying drawings; Figure 1 is a diagrammatic view of a safety car control equipment, with certain parts shown in section, and embodying my invention; and Fig. 2 a section on the line 2—2 of Fig. 1.

The safety car control equipment shown in the drawings is of the double end type equipped at each end with a door control valve device 1, a brake valve device 2, a safety control portion 3, and a pedal lever 4. The car is also equipped with a combined straight air and emergency valve device 5, a brake cylinder 6, a double check valve device 7, a holding coil 8, and main reservoirs 9 and 10.

Each door control valve device 1 may comprise a casing having a valve chamber 11 connected to an emergency brake pipe 12 and containing a rotary slide valve 14 adapted to be operated by a handle 15.

Pipes 16 and 17, leading to the seat of valve 14 are connected to pneumatic door engines (not shown) for controlling the operation of the respective door engines to open the entrance and exit doors of the car (not shown). Pipes 18 and 19, leading to the seat of the slide valve 14, are also connected to said door engines and control the operation of the door engines to close the doors.

Each brake valve device 2 may comprise a casing having a piston chamber containing a piston 20 subject to the pressure of a coil spring 21. The upper end of the spring is contained in a movable cage 22 having a stem 23 which extends out through an opening in the casing. Contained in the casing is a fluid pressure supply valve 24 and an exhaust or release valve 25.

The release valve 25 is operatively connected to piston 20, so that in normal release, the valve is held off its seat, and the supply valve 24 is normally held seated by a spring 26 and is adapted to be unseated by the downward movement of the piston 20.

Pivotally mounted on the brake valve casing 2 is a lever 27 having an integral cap 28 adapted to engage the stem 23 and subject to the pressure of a coil spring 29, which engages the top of the casing 2. The end of the lever 27 is pivotally connected to one end of a rod 30, the other end of which is pivotally connected to the pedal lever 4. The lever 27 is provided with an arm 31 adapted to operate members in the safety control valve device 3.

Said safety control valve device 3 may comprise a casing having a chamber containing a movable bridging contact member 32 provided with a stem 33 which extends out of the casing and is adapted to be engaged by the arm 31. The contact member 32 normally bridges and connects contacts 34 and 35, the contact 34 being connected to a wire 36 leading to the contact 34 of the device 3 at the opposite end of the car and the contact 35 being connected at one end of the car to a wire 37, leading to the holding coil 8. At the other end of the car, the contact 35 is connected to a wire 38 which is connected to the trolley or power circuit 39. A coil spring 40 acts on the contact member 32 and tends to maintain the member in its circuit closing position.

The combined straight air and emergency valve device 5 may comprise a casing in which are mounted an emergency valve device and a relay valve device. The emergency valve device comprises a piston 41 contained in a piston chamber 42 connected to the emergency brake pipe 12 and a slide valve 43 adapted to be operated by piston 41 and contained in a valve chamber 44.

The relay valve device comprises a piston 45 contained in piston chamber 46, a release slide valve 47 contained in valve chamber 48 and adapted to be operated by said piston, and a fluid pressure supply valve 49, contained in valve chamber 50 and adapted to be operated by the stem 51 of piston 45.

The holding coil 8 controls a movable contact 52, which is adapted to close the power circuit of the car, when the coil 8 is energized. Upon deenergization of the coil, a spring 53 moves the contact 52, so as to open the power circuit.

In addition to the movable contact member 32, the safety control portion 3 also has a valve chamber 54 containing a valve 55 for controlling the venting of fluid from the emergency brake pipe 12 to a pipe 56, through which fluid under pressure is supplied to sand the rails. The valve 55 is provided with a stem 57, which extends out through an opening in the casing 3 and is adapted to be engaged by the arm 31.

A door and brake interlock device is associated with the safety control portion, comprising a valve piston 58, having the chamber at one side connected to a pipe 59 leading to the seat of the rotary valve 14 of the door control valve device 1, and adapted, when depressed by fluid pressure, against the pressure of spring 60, to establish communication from pipe 59 to a pipe 61 which connects with the exhaust outlet of the exhaust valve 25 of the brake valve device.

The double check valve device 7 is interposed in a straight air pipe having a section 63 leading to the brake valve device 2 at one end of the car, a section 64 leading to the brake valve device at the opposite end of the car, and a section 65, leading to the straight air emergency valve device 5. The double check valve device comprises a casing containing a double check valve 66 adapted to control communication from the pipe sections 63 and 64 to the pipe section 65.

In operation, the usual fluid compressor (not shown) compresses fluid into the first main reservoir 9 and thence, through a check valve 67 to the second main reservoir 10. Fluid under pressure is supplied from the main reservoir 9 through a pipe 68 to the emergency brake pipe 12, a choke fitting 69 having a restricted port 70, and a volume reservoir 71 being interposed in the pipe 68.

Fluid under pressure from the emergency brake pipe 12 flows to the piston chamber 42 of the emergency valve device, to the valve chamber of the supply valve 24 of the brake valve device 2, to the valve chamber 54, in the safety control portion 3, and to the rotary valve chamber 11 of the door control valve device 1.

Fluid under pressure from the second main reservoir 10 flows through pipe 72 to valve chamber 44 of the emergency valve device and to the valve chamber 50.

Assuming the operating end of the car to be at the left of the drawings, and the pedal lever 4 as being held in release position as shown in the drawings, no pressure is applied to the stem 23 of the brake valve device 2, by the cap 28. The spring 21 is thus not under compression and the piston 20 then operates to hold the valve 25 open, while the supply valve 24 is permitted to seat.

The door controlling valve device 1 being in the door closing position, fluid under pressure is supplied through ports in the rotary valve 14 to the door closing pipes 18 and 19, while the door opening pipes 16 and 17 are connected through cavity 73 with an atmospheric exhaust port 74.

If it is desired to apply the brakes, the pedal lever 4 is depressed from the position shown in the drawings, so that the lever 27 is operated to depress the stem 23, through the movement of the cap 28. The spring 21 is then compressed, so that its pressure acts to depress the piston 20. The movement of said piston first permits the exhaust valve 25 to be seated and then further movement of the piston causes the valve 24 to be unseated.

When valve 24 is unseated, fluid under pressure is supplied from the emergency brake pipe 12 to chamber 75 and flows thence through passage 76 which connects with pipe 63. Fluid then flows from pipe 63, past the double check valve 66 to pipe 65, which is connected, through a passage 77, cavity 78 in emergency slide valve 43 and passage 79 with piston chamber 46.

The piston 45 is then operated by fluid pressure to first shift the release slide valve 47, so as to cut off communication from the brake cylinder 6 and valve chamber 48 to the exhaust port 80 and then further movement of the piston stem 51 operates to unseat the valve 49, so that fluid under pressure is supplied from the valve chamber 50 and the main reservoir 10 to valve chamber 48 and the brake cylinder 6, thus causing the brakes to be applied by fluid under pressure supplied to the brake cylinder.

When the pressure of fluid supplied to chamber 75 of the brake valve device 2 has been increased to a degree slightly exceeding the pressure of spring 21 on the piston 20, said piston will be moved upwardly so as to permit the valve 24 to seat and thus cut off the further supply of fluid under pressure to the pipe 63.

When the pressure of fluid supplied to valve chamber 48 of the relay valve device has been increased to a degree slightly in excess of the pressure of fluid supplied to the straight air pipe 63 and the piston chamber 46, the piston 45 will be shifted, so as to permit the valve 49 to seat and thus cut off the further supply of fluid to the brake cylinder.

If the pedal lever 4 be released from the position shown in the drawings, as when the operator becomes incapacitated, the spring 29 will act through the cap 28 to shift the lever 27, so that the arm 31 will engage the stem 33 and depress same. The contact member 32 is then shifted, so as to open the circuit to the holding coil 8, and the coil being de-energized, the spring 53 operates the contact member 52 to open the power circuit of the car.

The depression of the arm 31 also acts to depress the stem 57, so as to unseat the valve 55 and thereby fluid under pressure is vented from the emergency pipe 12 to the sand pipe 56. The rails are thus sanded and the venting of fluid from the brake pipe causes the emergency piston 41 to be shifted outwardly to emergency position, in which a port 81 in the slide valve 43 registers with passage 79.

Fluid under pressure is then supplied from valve chamber 44 and the main reservoir 10 to piston chamber 46, so that piston 45 is operated as in effecting a straight air application of the brakes, to unseat the supply valve 49, and thereby supply fluid under pressure to the brake cylinder, to effect an emergency application of the brakes.

When the door controlling valve device 1 is operated to open the car doors, fluid under pressure is supplied to the door opening pipes 16 and 17 and at the same time, a cavity (not shown) in the rotary valve 14 connects the door opening pipes with the pipe 59, so that fluid under pressure is supplied to the piston 58. Said piston is then shifted, so as to open the pipe and passage 61 to the upper side of the piston and thus fluid under pressure is permitted to flow from pipe 59 to pipe 61. If the brakes have not previously been applied by operation of the brake valve device, and the exhaust valve 25 is in its open position, then fluid under pressure will be supplied from pipe 61, past the valve 25, to chamber 75 and will flow from said chamber to pipe 63. The brakes will then be applied by fluid supplied to the pipe 65, in the same manner as hereinbefore described when effecting a straight air application by operation of the brake valve device 2.

When the operator wishes to go from one end of the car to the other, the brake pedal may be locked to prevent the release of the pedal from effecting an emergency application of the brakes, provided the pedal lever is first moved to the straight air brake applying position.

The locking device may comprise a casing 82 secured in the car adjacent to the pedal lever 4. A locking lever 83 is secured to a shaft 84 having a bearing in said casing and the locking lever is provided with a hook portion 85 adapted to engage a lug 86 carried by the pedal lever 4.

The parts are so positioned that the hook portion 85 will not engage over the lug 86, unless the pedal lever 4 has been moved to its straight air service application position. As a result, the pedal lever cannot be locked against its movement to effect an emergency application of the brakes by release of the pedal lever, except by moving the pedal lever so as to effect a service application of the brakes.

In order to prevent unauthorized persons from operating the pedal lever 4 at the non-operating end of the car, means are provided to prevent movement of the locking lever 83 from its pedal lever locking position, unless released by the operation of a key or similar device.

For this purpose, the shaft 84 may be provided with a recess 87, into which a pin 88 is pressed by a spring 89, when the locking lever 83 is moved to its locking position. The pin 88 carries a head 90 adapted to be engaged by a suitable key 91, adapted to be carried by the operator.

When the key 91 is inserted and rotated, the head 90 is moved, so as to shift the pin 88 out of the recess 87 in the shaft 84, thus permitting the shaft 84 and the locking lever 83 to be rotated out of the locking position.

In going from one end to the car to the other, the operator moves the pedal lever 4 to the position for effecting a straight air application of the brakes, and then shifts the locking lever 83 so as to lock the pedal lever in position.

The brakes are now applied by straight air, as hereinbefore described, and the operator goes to the other end of the car. At the other end of the car, the pedal lever 4, as shown at the right of the drawing, is locked in brake applied position, and the operator must insert the key 91, which he carries with him, so as to retract the stem 88. The locking lever 83 is then moved out of its locking position, and the foot of the operator being applied to the pedal lever 4, the operator permits the lever to move back to brake release position.

The pressure of fluid in the straight air pipe 64 is then released at the right hand side of the car, the exhaust valve 25 of the brake valve device 2 being open, and fluid being vented by way of pipe 61 and exhaust port 92.

The fluid pressure acting at the right hand side of the double check valve 66 is thus vented to the atmosphere, so that the pressure of fluid acting at the left hand side of the double check valve 66, shifts said check valve to the right, so that communication is now opened from pipe 65 to pipe 64.

Fluid under pressure in the piston chamber 46 of the relay valve device is then released by way of pipe 64 and the piston 45 is shifted to release position in which the brake cylinder 6 is connected, through ports in the slide valve 47 with the atmospheric exhaust port 80.

The rails may be sanded by turning the door controlling valve device handle 15 to sanding position, in which the sanding pipe 56 is connected to the rotary valve chamber 11, so that fluid under pressure is supplied to the sanding pipe 56, to effect the sanding of the rails.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a pedal lever, of means operated upon depression of said lever for applying the brakes, means operated upon release of said lever for applying the brakes, and means for mechanically locking said lever against movement to apply the brakes upon release of the lever.

2. In a fluid pressure brake apparatus, the combination with a pedal lever, of means operated upon depression of said lever for applying the brakes, means operated upon release of said lever for applying the brakes, and means for mechanically locking said lever against movement to apply the brakes upon release of the lever, if the brakes have previously been applied.

3. In a fluid pressure brake apparatus, the combination with a pedal lever, of means operated upon depression of said lever for applying the brakes, means operated upon release of said lever for applying the brakes, means for locking said lever against movement to apply the brakes upon release of the lever, and means for locking said locking means against movement from its locking position.

4. In a fluid pressure brake apparatus, the combination with a pedal lever, of means operated upon depression of said lever for applying the brakes, means operated upon release of said lever for applying the brakes, a member movable to a position for locking said pedal lever against movement to apply the brakes, and means for locking said member to prevent movement thereof from its locking position.

5. In a fluid pressure brake apparatus, the combination with a pedal lever, of means operated upon depression of said lever for applying the brakes, means operated upon release of said lever for applying the brakes, a member movable to a position for locking said pedal lever against movement to apply the brakes, means for locking said member to prevent movement thereof from its locking position, and a removable device for releasing said locking means.

6. In a fluid pressure brake apparatus, the combination with a pedal lever, of means operated upon depression of said lever for applying the brakes, means operated upon release of said lever for applying the brakes, a member movable to a position for locking said pedal lever against movement to apply the brakes, means for locking said member to prevent movement thereof from its locking position, and a key device for releasing said locking means to permit movement of said locking means from its locking position.

7. In a fluid pressure brake apparatus, the combination with a pedal lever, of means operated upon release of said pedal lever for applying the brakes by fluid under pressure and a manually operable member movable to a position for engaging said lever to lock same and thereby prevent movement of said lever to apply the brakes.

8. In a fluid pressure brake apparatus, the combination with a pedal lever, of means operated upon release of said pedal lever for applying the brakes by fluid under pressure, a manually operable member for locking said lever against movement to apply the brakes, means for locking said member against movement from its locking position, and a key device for releasing said locking means to permit movement of said locking member from its locking position.

9. In a car door and brake control apparatus, the combination with a brake cylinder and an engineer's brake valve device for controlling the application and release of the brakes and including a release valve for controlling the release of fluid from the brake cylinder, of means for controlling the operation of the car doors and means operating upon operation of said car door controlling means to open the car doors for supplying fluid under pressure to effect an application of the brakes, communication through which fluid under pressure is supplied to apply the brakes being controlled by said release valve.

10. In a car door and brake control apparatus, the combination with a brake cylinder and a straight air pipe through which fluid under pressure is supplied to the brake cylinder to effect an application of the brakes, of an engineer's brake valve device for controlling the supply and release of fluid under pressure to and from said pipe and including a release valve for controlling the release of fluid from the brake cylinder and communication from the brake cylinder through said pipe being controlled by said release valve, means for controlling the operation of the car doors, and means controlled by said car door controlling means for also supplying fluid under pressure to said pipe.

11. In a car door and brake control apparatus, the combination with a brake cylinder and a straight air pipe through which fluid under pressure is supplied to the brake cylinder to effect an application of the brakes, of an engineer's brake valve device for controlling the supply and release of fluid under pressure to and from said pipe and including a release valve for controlling the release of fluid from the brake cylinder, means for controlling the operation of the car doors, and means controlled by said car door controlling means for also supplying fluid under pressure to said pipe, communication through which fluid under pressure is supplied to said pipe being controlled by said release valve.

12. In a safety car control equipment, the combination with an emergency brake pipe and an emergency valve device operated upon a reduction in pressure in said pipe for effecting an emergency application of the brakes, of a pipe through which fluid under pressure is supplied to effect the sanding of the rails, a pedal lever, and means operated upon release of the pedal lever for venting fluid under pressure from the emergency brake pipe to said sanding pipe to thereby effect the operation of said emergency valve device.

In testimony whereof I have hereunto set my hand, this 26th day of September, 1929.

JOSEPH C. McCUNE.